March 3, 1959 F. GEORGES 2,875,601
TORQUE LIMITER CLUTCH
Filed July 8, 1957 3 Sheets-Sheet 1

INVENTOR
FELIX GEORGES
BY
Watson, Cole, Grindle & Watson
ATTORNEYS

United States Patent Office 2,875,601
Patented Mar. 3, 1959

2,875,601
TORQUE LIMITER CLUTCH

Félix Georges, Uccle, Belgium, assignor to Societe Auxiliaire d'Industrie (Sadi) S. P. R. L., Forest, Belgium, a company Application July 8, 1957, Serial No. 670,460

Claims priority, application Belgium July 13, 1956

6 Claims. (Cl. 64—29)

The present invention concerns the coupling sleeves used for imparting a rotary motion to a driven shaft by a driving shaft.

There are already numerous types of known couplings which have been designed to restrict the transmission to a driven shaft of a limited torque, where use is made of balls between the driving and driven plates.

Thus, for example, transmission systems have been advocated, in which balls are lodged in holes in a driving plate, each of which, being spring loaded, is able to penetrate holes in an intermediate component which is integral with the driven plate.

Mechanisms of this kind are extremely delicate to adjust. Apart from the fact that each ball is subjected to the action of its particular spring the tension of which can be modified, the balls in systems such as this do not run, practically speaking, but instead they rub against the walling, causing both wear and a rapid dislocation of the equipment.

Moreover, the setting of the intermediate components has to be effected separately for each ball, which means that it is a long, delicate and precise job.

The object of the present invention is to afford a remedy for these drawbacks and to provide a ball-operated overload clutch of simple construction, easily adjustable, and working free of shock, and embodying a return of the balls into their sockets.

With this end in view, the coupling sleeve constituting the subject of the invention, and of the kind in which use is made of balls between two plates—driving and driven—is characterized in that each of the balls employed is lodged between two opposing hemispherical sockets of a radius equal to that of the balls and sunk into each of the two plates or into members which are integral with same.

Around the same circle as the sockets, the driving and driven plates also have a circular groove which serves as a ballrace and whose profile is of the same radius as that of the balls but the depth of which is less than that of the sockets.

The two plates which hold the balls are gripped one against the other by the action of a series of springs.

The pressure exerted by these springs can be adjusted by manipulating the threaded cap holding the springs in position.

The plates are fitted one inside the other using intermediate members if necessary, in such a way that one encloses the rim of the other leaving a slight amount of play with a view to imprisoning air in the dead spaces between the balls thereby damping the movement back into the working position.

The invention will be further described with reference to the accompanying drawings representing one manner of execution:

Figure 5:
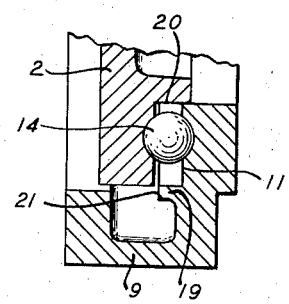

Figure 5 gives a partial sectional view of the equipment just at the moment when the balls are in the ballrace halfway between two sockets, that is to say, just as a disengagement is taking place.

Keyed on to driving shaft 1 (Figure 1) is a plate 2 in which a circular crown of close-lying hemispherical sockets 4 (Figures 1 and 2) has been sunk, together with a ballrace 3.

The hemispherical sockets 4 and ballrace 3 are located along the same circle and both are arranged concentrically to the axis of plate 2.

The transverse profile of the circular ballrace 3 has the same radius as the hemispherical sockets 4 but the depth of the ballrace is less than that of the sockets.

Over on the other side, keyed on to receiving shaft 6 and located on the same axis as the driving shaft 1, there is a plate 5 which is integral with a flange 7 by means of a series of teeth and splines 8. Thus, flange 7 is able to move, in relation to plate 5, along its longitudinal axis though it is unable to rotate about this axis without taking with it plate 5 or vice versa.

Fitted on flange 7 is a casting 9 and on this there is a cover 10. Thus, the assembly comprising flange 7, casting 9 and cover 10 is able to move longitudinally in relation to plate 5 though it cannot undergo any angular displacement in relation to same.

Walling 11 of casting 9 facing plate 2 has a circular crown of close-lying hemispherical sockets 13 and a ballrace 12 identical with those numbered 4 and 3 of plate 2 arranged around the same circle and concentric with the axis of the equipment.

The hollow spheres constituted by the opposing sockets of plate 2 and casting 9 are the places in which balls 14 of the same diameter will become lodged.

Fitted inside cover 10 and held in place by threaded caps 16 there is a series of springs 15 which press plate 2 against walling 11 of casting 9 by way of friction washer 17.

A circular continuation flange 19 of casting 9 encloses—with a slight clearance—the rim of plate 2. In the same manner a circular continuation flange 20 of plate 2 engages with a slight clearance inside the inner diameter of casting 9.

The coupling thus described functions in the following manner:

After adjusting the equipment to transmit a determined force the rotary movement is transmitted by driving plate 2 to receiving plate 5, these being keyed respectively on the driving and driven shafts 1 and 6 by way of balls 14.

If, for some reason, the force applied to the receiving shaft 6 exceeds the limit assigned to it and to which the limiter has been set, the balls 14, driven by driving plate 2 rise up and run between races 3 and 12 from the sockets in which they were imprisoned into the next sockets.

The force necessary to bring about this displacement depends on the relative depth of races 3, 12 and sockets 4, 13. The nearer the depth of the races approaches that of the sockets, the less will be the force required. The limit values of the force are as follows: zero when the depth of the races is equal to that of the sockets (in which case the balls would be free absolutely to run around the circle along which they are arranged), infinity when the depth of the races equals zero.

It is a very easy matter to arrange matters so that the disengaging force is weaker in one of the two directions of rotation; all that is necessary in fact is to incline the walling of the sockets more towards that particular direction of rotation. To bring about these conditions it would be sufficient for instance, to use a cylindrical milling tool having a spherical tip which would be inclined at an angle in relation to the plane of the plates into which the sockets are being sunk.

In their passage from one socket to another, the balls compress springs 15 by axially displacing the assembly made up of flange 7, casting 9 and cover 10. This axial displacement of assembly 7—9—10 is made use of to actuate an auxiliary appliance 18 which brings to a standstill the motor driving shaft 1.

While the balls 14 are being displaced, friction washer 17 on which springs 15 bear, slides over facing 23 of plate 2.

When the balls drop back into the sockets, assembly 7—9—10 re-assumes its original position. Normally at this juncture a fairly violent shock would be felt when plate 2 and casting 9 suddenly make contact again under the action of springs 15.

Figure 1:
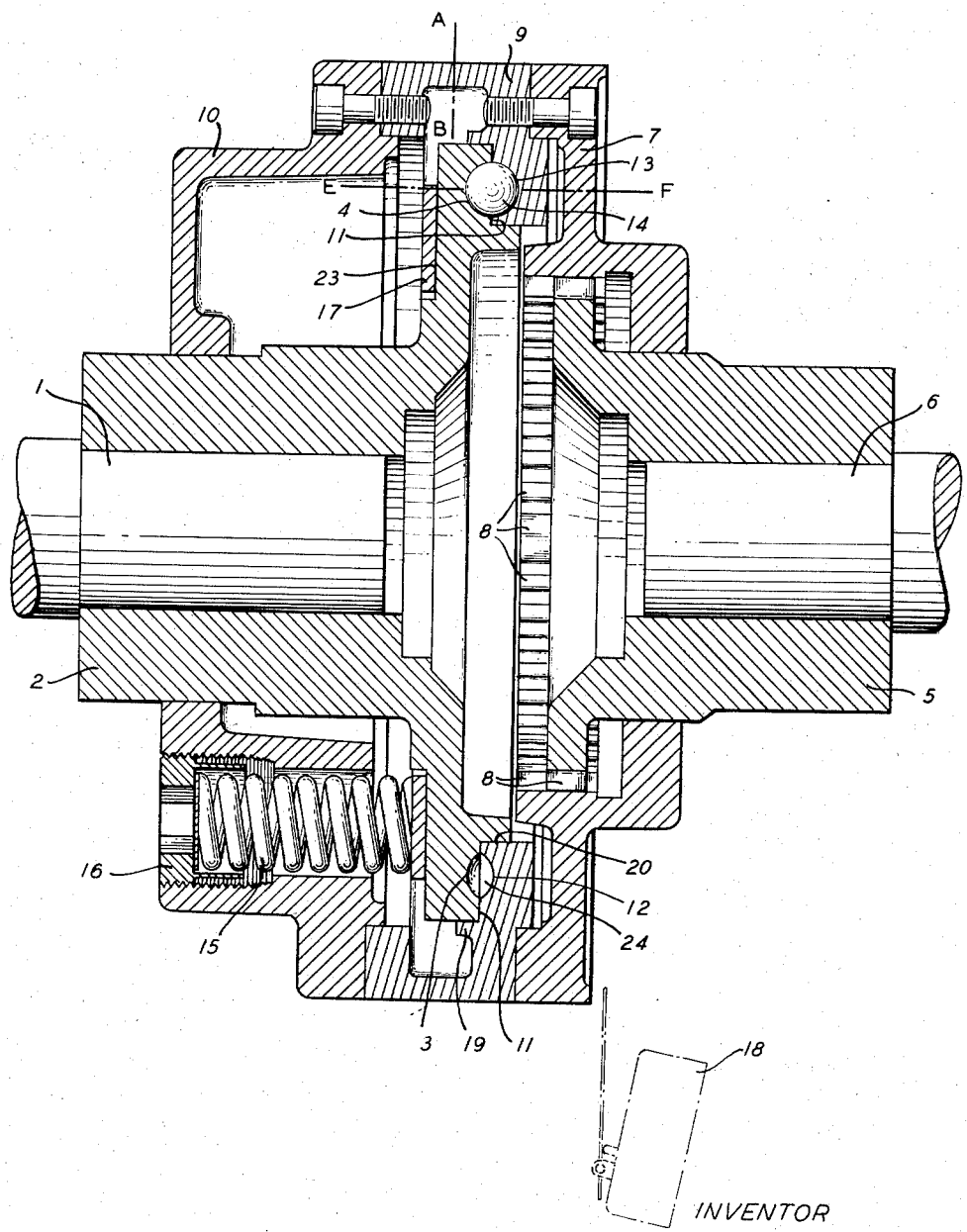
Figure 1 is an axial section of the clutch.
Figure 2:
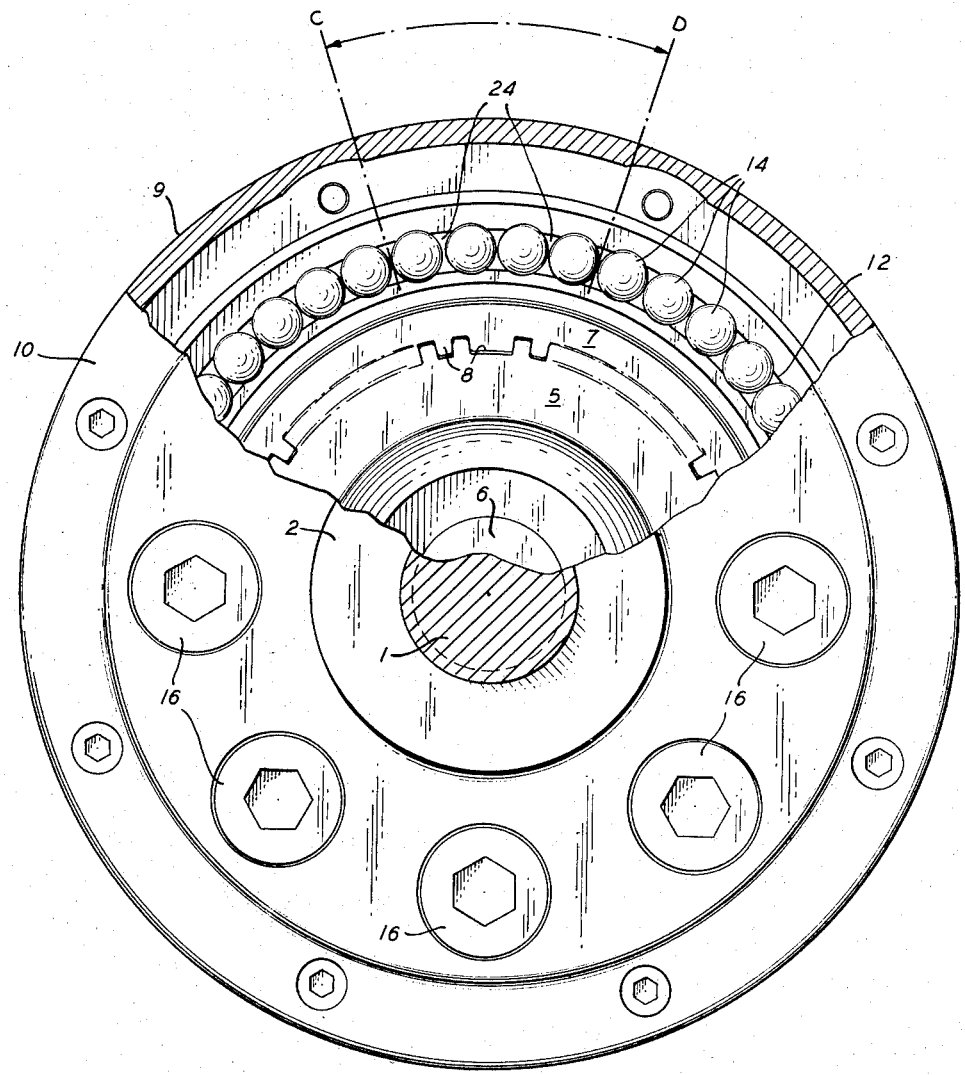
Figure 2 represents a plan view with partial section along line AB of Figure 1, plate removed.
Figure 3:
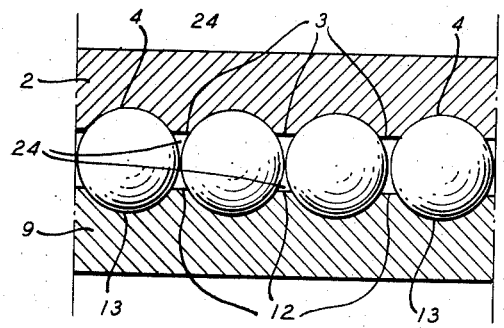
Figure 3 shows, on an enlarged scale, a profile developed along CD of Figure 2 and sectioned along EF of Figure 1, the coupling being in the normal working position.

With the object of avoiding any harmful effect produced by this kind of shock both in the coupling itself as well as in the bearings, of the driving and driven shafts 1 and 6, the return movement of assembly 7—9—10 is checked by a pneumatic shock-absorber acting as follows: when at rest or operating at a torque less than that for which the clutch has been adjusted, balls 14 completely fill the hemispherical sockets of plate 2 and the ones opposite, in casting 9. The only empty spaces are the tiny gaps 24 enclosed by races 3 and 12 between sockets 4 and 13 (Figures 1–2–3).

Figure 4:
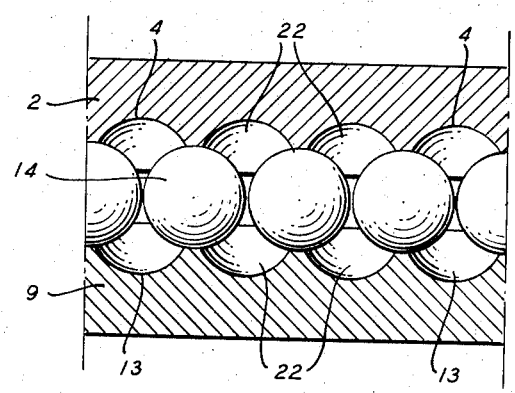
Figure 4 is a profile similar to that of Figure 3, the balls being located in the ballrace in an intermediate position between two sockets, that is to say, just at the moment when disengagement is taking place.

The moment balls 14 are released and they move from one socket into the next, plate 2 and casting 9 come apart suddenly, leaving between them a greatly enlarged empty space 22 (Figures 4 and 5).

In this space 22 a drop in pressure takes place, air not being able to penetrate owing to the presence of the circular flanges 20 of plate 2 and 19 of casting 9. At the furthest point of separation between plate 2 and casting 9, when the balls are midway between two successive sockets, air is drawn in through circular opening 21 to fill up dead space 22. This is rendered possible by the fact that flange 19 is designed shorter than the maximum distance separating plate 2 from casting 9.

Immediately the action of springs 15 causes balls 14 to run into the next socket, plate 2 and casting 9 come together and opening 21 closes again so that the air which is imprisoned in dead space 22 is compressed thereby damping the return movement of casting 9 towards plate 2.

Circular races 3 and 12 of plate 2 and casting 9—as already explained in the foregoing—play their part—by carefully selecting their depth in relation to the depth of the sockets—in fixing the force necessary to disengage the equipment. The final setting is effected by adjusting springs 15.

Moreover, races 3 and 12 are intended to keep up the displacement of balls 14 along the circle of sockets without it being necessary to resort to any auxiliary equipment such as ball cages. Thus, the appliance functions with a minimum of wear, the balls running friction-free in the races, and no other guide member is necessary.

What is claimed is:

1. A torque limiter clutch comprising two plates, one of said plates being a driving plate, the other of said plates being a driven plate, means for coupling said plates to permit axial movement between the driven and driving plates including ball means, resilient means urging said plates in opposite directions toward each other, portions of said plates defining a plurality of contiguous hemispherical sockets lying opposite each other and of a radius equal to that of the ball means, the sockets being sunk respectively in each of said plates and means including said plates for defining a shock absorber between said plates to damp the movement of said plates toward each other.

2. A torque limiter clutch in accordance with claim 1 wherein the driving and driven plates define a circular groove connecting said sockets and serving as a ballrace, the profile of said groove being of the same radius as that of said ball means, said groove having a depth less than that of said sockets.

3. A torque limiter clutch in accordance with claim 1 wherein said resilient means includes a plurality of springs and a washer positioned between said plurality of springs and one of said plates, said plates having an annular opening therebetween when said ball means causes said plates to separate, said plurality of springs causing said ball means to run into the adjacent socket and permit said plates to move toward each other and close said annular opening whereby air is entrapped between said plates thereby producing said dampening effect.

4. A torque limiter clutch in accordance with claim 3 further including means for adjusting the pressure exerted by said springs, said last mentioned means comprising threaded caps holding the springs in position.

5. A torque limiter clutch in accordance with claim 1 further comprising a first and a second rim on said plates defining a pneumatic shock absorber between said plates.

6. A torque limiter clutch in accordance with claim 5 wherein said first rim extends from one of said plates adjacent the inner periphery of said sockets and said second rim extends from the other of said plates adjacent the outer periphery of said sockets, said second rim extending from said second plate a distance less than the maximum distance between said plates during the coupling of said plates.

References Cited in the file of this patent

UNITED STATES PATENTS

| | | |
|---|---|---|
| 865,486 | Gannon | Sept. 10, 1907 |
| 1,256,947 | Stampen | Feb. 19, 1918 |
| 1,840,682 | Sheldrick et al. | Jan. 12, 1932 |
| 1,881,633 | Johnson | Oct. 11, 1932 |
| 2,490,172 | Swahnberg | Dec. 6, 1949 |
| 2,587,712 | Dodge | Mar. 4, 1952 |